United States Patent
Pavlik

(10) Patent No.: US 7,213,239 B2
(45) Date of Patent: May 1, 2007

(54) METHOD OF GENERATING AND/OR EXECUTING A DIVERSIFIED PROGRAM FLOW

(75) Inventor: Rolf-Dieter Pavlik, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 601 days.

(21) Appl. No.: 10/306,790

(22) Filed: Nov. 27, 2002

(65) Prior Publication Data

US 2003/0125824 A1  Jul. 3, 2003

(30) Foreign Application Priority Data

Nov. 28, 2001  (DE) ................ 101 58 317

(51) Int. Cl.
*G06F 9/45* (2006.01)
*G06F 9/445* (2006.01)

(52) U.S. Cl. .............. 717/140; 717/113; 700/21

(58) Field of Classification Search ............... 703/24; 717/174, 103, 140, 113; 700/2, 4, 17, 18, 700/21
See application file for complete search history.

(56) References Cited

U.S. PATENT DOCUMENTS

| | | | |
|---|---|---|---|
| 5,905,855 A | | 5/1999 | Klaiber et al. |
| 6,892,382 B1 * | | 5/2005 | Hapner et al. ............ 717/174 |
| 6,928,648 B2 * | | 8/2005 | Wong et al. .............. 719/328 |
| 6,931,627 B2 * | | 8/2005 | Arbouzov et al. .......... 717/124 |
| 7,051,316 B2 * | | 5/2006 | Charisius et al. ........... 717/103 |
| 2002/0065067 A1 * | | 5/2002 | Khare et al. ............... 455/414 |
| 2002/0103881 A1 * | | 8/2002 | Granade et al. ........... 709/218 |
| 2002/0169591 A1 * | | 11/2002 | Ryzl ........................ 703/24 |

OTHER PUBLICATIONS

Sun Microsystems, Inc., "Mobile Information Device Profile JSR-37 Specification", Dec. 2000 (48 pages extracted). [Online] [Retrieved at] <java.sun.com/products/midp/index.jsp>.*
"Generating a Deployment Descriptor from your Service Classes", N. Gouteux, Jul. 26, 2001 (9 pages). [Online] [Retrieved at] <http://www.soapuser.com/ngx_26jul01.html>.*
Hölscher H. and Rader J., Mikrocomputer in der Sicherheitstechnik, Verlag TÜV Rheinland, Köln, 1984, pp. 7-81 and 7-82.
Lexikon der Informatik und Datenverarbeitung/hrsg. of Hans-Jochen Schneider, 3. edition, Oldenbourg-Verlag, Munich, Wien, 1991, pp. 146, 147 and 410.

(Continued)

*Primary Examiner*—Tuan Dam
*Assistant Examiner*—Thuy Dao
(74) *Attorney, Agent, or Firm*—Henry M. Feiereisen

(57) ABSTRACT

In a method of generating and/or executing a diversified program flow from a program source code for or on at least two processing units of a machine tool, production machine or robot, a machine code is generated from a program source code by a compiler for at least one processing unit with a programmable processing module. The program source code is also used to generate by a converter or interpreter a description file which is run interpretatively in at least one further processing unit by at least one programmable processing module. Data of the processing units is saved in at least one common memory and checked for a match through respective data comparison.

7 Claims, 2 Drawing Sheets

OTHER PUBLICATIONS

Gowen L D: "Developing and analyzing high-level designs for safety-critical solftware systems", Proceedings IEEE Southeastcon '93 (Cat. No. 93CH3295-3) IEEE New York, NY, USA, Apr. 1993, p. 8 p., XP010146815 ISBN: 0-7803-1257-0, 8 pages.

Kazi I H et al.: "Techniques for obtaining high performance in Java programs", ACM Computing Surveys, ACM, New York, US, vol. 32, No. 3, Sep. 3, 2000, pp. 213-240, XP002958726 ISSN: 0360-0300.

Avizienis A et al.: "On the implementation of N-version programming for software fault-tolerance during program execution" The IEEE Computer Society's First International Computer Software and Applications Conference IEEE New York, NY, USA, Nov. 1977, pp. 149-155, XP001183455.

Hitt E F: "Fault tolerant avionics display system" Proceedings. IEEE/AIAA 10th Digital Avionics Systems Conference (Cat. No. 91CH3030-4) IEEE New York, NY, USA, Oct. 1991 pp. 393-398, XP010093725.

* cited by examiner

METHOD OF GENERATING AND/OR EXECUTING A DIVERSIFIED PROGRAM FLOW

CROSS-REFERENCES TO RELATED APPLICATIONS

This application claims the priority of German Patent Application, Serial No. 101 58 317.6, filed Nov. 28, 2001, pursuant to 35 U.S.C. 119(a)–(d), the disclosure of which is incorporated herein by reference.

BACKGROUND OF THE INVENTION

The present invention relates to a method of generating and/or executing a diversified program flow from a program source code for or on at least two processing units of machine tools, production machines and robots.

Security zones are normally established in order to protect machines, production goods, persons against dangers in the security zone of machines or the like, and monitored, e.g. by sensors. A logical interconnection structure, related to the safety aspects of the machine and based on a programmable control, executes a defined action when the security zone is violated. The safety-related actions may involve, for example, a shutdown, certain operations in case of emergency, slowdown, position restrictions, etc. Hereby, the safety-related actions or security functions include system manipulations that may even involve the electric drives and measuring systems. A reliable function of secure operational modules in executable programs is hereby essential.

To ensure clarity, it is necessary to establish the definition of several important terms and expressions that will be used throughout this disclosure. The term "safety-related" designates hereby the recognition and managing of systematic and random errors, as well as failures. This can be realized, e.g., by the use of diversity in connection with computer systems or control systems of machine tools, production machines and robots, whereby the diversity involves the establishment of, e.g., several programs which satisfy the same specification. A comparison of the events, computed by the individual program variants, enables hereby a recognition of permanent and transient hardware errors in addition to the recognition of errors in design.

Typically, a logic program is used which involves redundant-parallel processing and cyclical comparison of results. When a deviation of the computed results has been ascertained, a secure state of the machine or of machine parts is immediately initiated.

It would be desirable and advantageous to provide an improved method of generating and/or executing a diversified program flow from a program source code.

SUMMARY OF THE INVENTION

According to one aspect of the present invention, a method of generating and/or executing a diversified program flow from a program source code for or on at least two processing units of a machine tool, production machine or robot, includes the steps of generating a machine code from a program source code by means of a compiler for at least one processing unit with a programmable processing module, generating a description file from the program source code, interpretively processing the description file in at least one further processing unit by at least one programmable processing module, saving data of the processing units in at least one common memory, and checking the data for a match through respective data comparison.

The present invention resolves prior art shortcomings by enabling the user to establish a single program source code for generating at least two diversified programs. The description file ensures conformity of the programs which are run parallel, e.g., simultaneously, by the processing units. The running time of the programs by the various processing units varies since at least one program code runs interpretively, thereby realizing program diversity. As a consequence, time and cost factors are reduced for the user or the system programmer because it is sufficient to input a program source code only once.

According to another feature of the present invention, the programmable processing modules may initiate a safe state of at least one part or section of the machine tool, production machine or robot, when the data comparison is negative. This ensures safe conditions of the machine or machine part, in the event of an inconsistency of the present data or data to be computed.

According to another feature of the present invention, the at least two programmable processing modules in the processing units may have same hardware. As an alternative, the at least two programmable processing modules in the processing units may have different hardware. In this way, the novel and inventive method according to the invention is also applicable for different processing modules. In particular, as the development becomes more and more sophisticated or also for cost-reasons, the processing modules may be of different configuration. On the basis of the description file, interpretively running commands are provided to suit the respective processing module.

According to another feature of the present invention, at least one of the processing modules may be a user-programmable or mask-programmable logic module. Thus, optical solutions by means of a field programmable gate array (FPGA) or an application specific integrated circuit (ASIC) may be realized.

According to another feature of the present invention, the program source code may be generated substantially from a graphical programming editor. Thus, linkage and interrelations can be graphically programmed, whereby the graphic editor may also generate the program source code from the information contained in the graphical editor.

According to another feature of the present invention, the description file may be generated from the program source code directly or by means of a converter or interpreter. Thus, the description file can be automatically generated from the program source code.

According to another feature of the present invention, the machine code may be generated from the description file by means of a converter. Thus, the description file can be the basis of a compiled machine code as well as of a program code which runs interpretatively in a processing unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
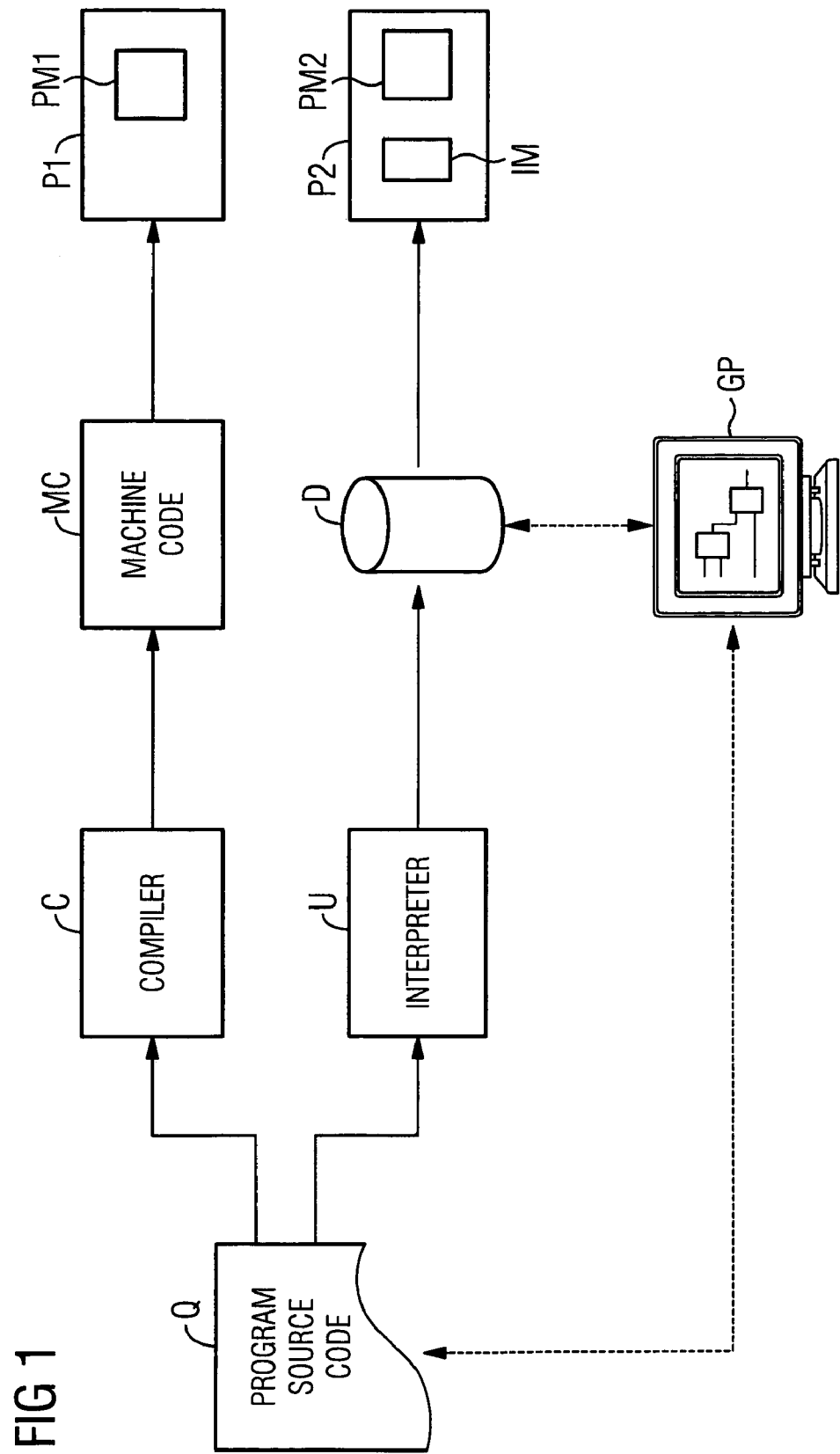
FIG. 1 is a block diagram for generating a diversified program flow in accordance with the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a block diagram for generating a diversified program flow in accordance with the present invention. Hereby, in a first data path, a compiler C generates from a program source code Q a machine code MC which is run by a processing module PM1 of a processing unit P1.

In accordance with the present invention, in a second data path, an interpreter or converter U generates from the program source code Q a description file D which is run interpretatively by the processing module PM2 on the processing unit P2. The time to run a program interpretatively by the processing module PM2 is different from the processing time required to run the machine code MC on the processing module PM1. The processing units P1, P2, as well as the processing modules PM1, PM2 may have different configuration. Although they process the syntactic structure of the program source code Q in the source program, different command sequences are generated along different paths as a consequence of the different programs run by the processing modules PM1, PM2. The description files D contains hereby relevant information, which is stored in the program source code Q, and serves as base for the processing unit P2 which runs interpretatively the content of the description file D by means of a permanently installed software interpreter module IM.

Graphical programming by means of a graphical program editor GP is a simple approach to input or visualize a program flow in a computer system. Therefore, a graphical programming editor GP can be used also in the present invention to directly generate the description file D and/or to generate the program source code Q, as indicated in FIG. 1 by broken lines. The use of the graphical programming editor GP is optional.

Figure 2:
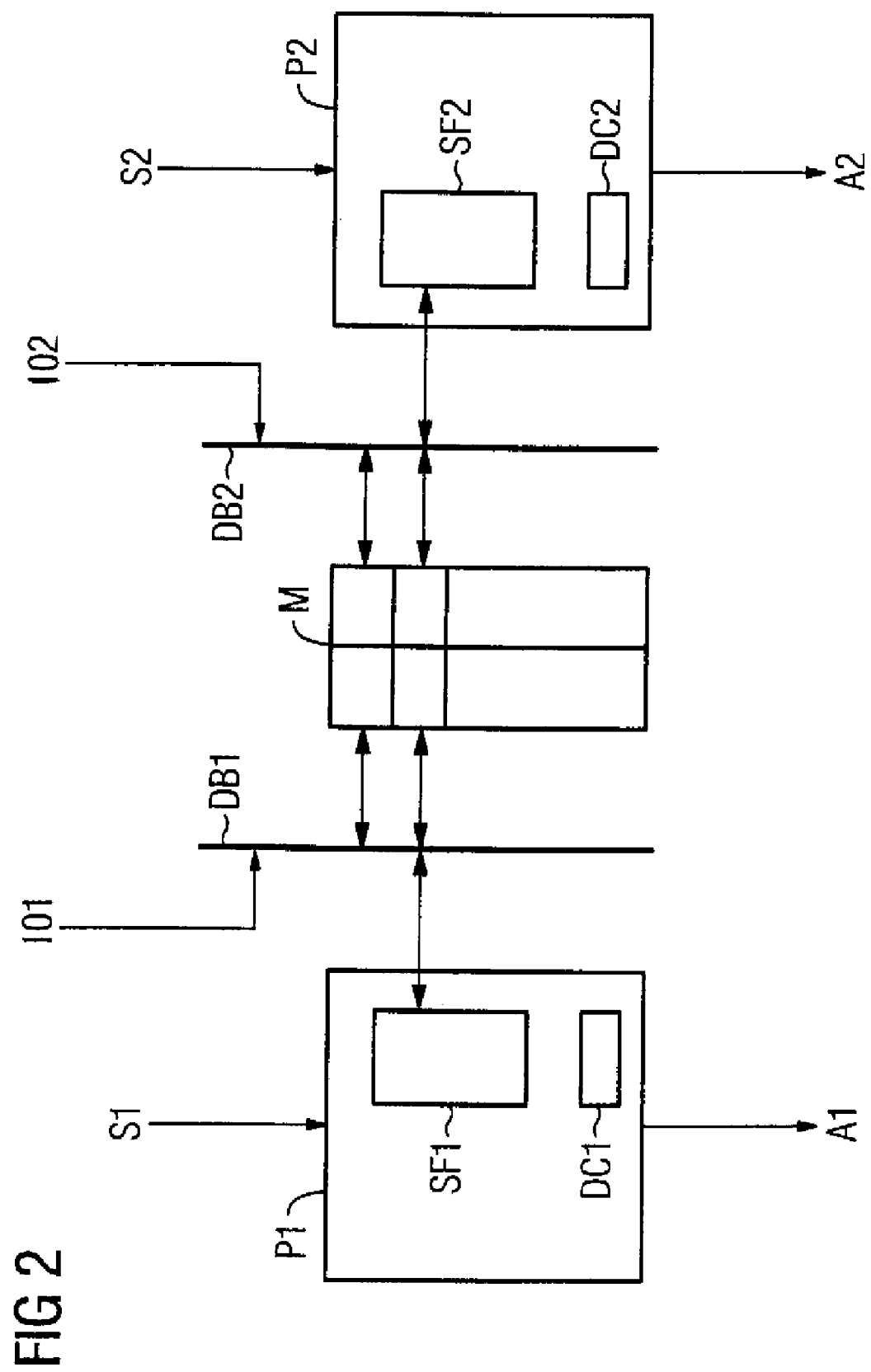
FIG. 2 is a schematic representation for executing distinct programs on processing units.

Turning now to FIG. 2, there is shown a schematic representation for executing distinct programs by the processing units P1, P2. Parts corresponding with those in FIG. 1 are denoted by identical reference numerals. Each of the processing units P1, P2 is supplemented by a data comparison structure DC1, DC2 and a secure functional module SF1, SF2, generated from the program source code Q by means of compiler C and interpreter or converter U.

Information, e.g., emergency-off signals or door sensor signals, is inputted via a sensor S1, S2 into the processing units P1, P2, for producing computed results, under consideration of further programming commands. As a consequence, for example, an actuator A1, A2, e.g. a brake (brake signal) or safety contactor, may be addressed. Each of the sensors S1, S2 and the actuators A1, A2 is configured with at least two channels. Respective sensor signals S1, S2 are inputted into the two processing units P1, P2 and provide in view of the configuration same information through two channels. In the event of an error, i.e., when, for example, the sensor signal S1 does not coincide with the sensor signal S2, the machine is transferred into a safe machine state by means of the secure functional modules SF1, SF2.

Further input-output information IO1, IO2 may be transmitted to the sensor signals S1, S2 and are written via a data bus DB1, DB2 in a memory M, e.g. a dual port RAM. The memory M further contains computation data of the processing units P1, P2. After each, or after defined program flow steps, plausibility of the data saved in the memory M is checked by the processing units P1, P2 by means of data comparison DC1, DC2. When determining an inconsistency, the respective processing units P1, P2 change to a safe machine mode by activating the secure functional modules SF1, SF2 (software modules).

To prevent systemic and/or transient hardware errors, or product errors or data errors from being undetected, at least one of the processing units P1, P2 runs a complicated machine code MC, while the other one of the processing units P1, P2 runs interpretatively the content of the description file D. Examples of programmable processing modules PM1, PM2 include similar or different controllers, FPGAs or ASICs. Involved are hereby user-programmable or mask-programmable logical modules which can be suited in an optimum manner to the application at hand.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of generating and/or executing a diversified program flow from a program source code for or on at least two processing units of a machine tool, production machine or robot, comprising the steps of:
   reading in a first channel of a first sensor by a processing unit;
   generating a machine code from a program source code by a compiler for a first processing unit with a programmable processing module;
   running the machine code using the reading from the first channel of the first sensor and the first processing unit to produce data;
   generating a description file from the program source code using an interpreter;
   reading in a second channel of the first sensor by a further processing unit;
   running interpretatively the description file in the further processing unit by at least one further programmable processing module to produce data;
   saving the data produced by the processing units in at least one common memory; and
   checking the data for a match through respective data comparison, said programmable processing modules initiating a safe state in the machine tool, the production machine or the robot, if the data comparison is negative.

2. The method of claim 1, wherein the at least two processing modules in the processing units have same hardware.

3. The method of claim 1, wherein the at least two processing modules in the processing units have different hardware.

4. The method of claim 1, wherein at least one of the processing modules is a user-programmable or mask-programmable logic module.

5. The method of claim 1, wherein the program source code is generated substantially by a graphical programming editor.

6. The method of claim 1, wherein the description file is generated directly from the program source code.

7. The method of claim 1, wherein the machine code is generated from the description file by means of a converter.

* * * * *